United States Patent
Carter et al.

(10) Patent No.: US 9,732,463 B2
(45) Date of Patent: Aug. 15, 2017

(54) NANOPARTICLE FINISH FOR MINERAL AND CARBON FIBERS

(71) Applicants: H Landis Carter, Greer, SC (US); Shobha Murari, Greenville, SC (US)

(72) Inventors: H Landis Carter, Greer, SC (US); Shobha Murari, Greenville, SC (US)

( * ) Notice: Subject to any disclaimer, the term of this patent is extended or adjusted under 35 U.S.C. 154(b) by 239 days.

(21) Appl. No.: 14/610,458

(22) Filed: Jan. 30, 2015

(65) Prior Publication Data

US 2015/0140312 A1   May 21, 2015

Related U.S. Application Data

(63) Continuation-in-part of application No. 12/072,961, filed on Feb. 29, 2008, now abandoned.

(51) Int. Cl.

| | | |
|---|---|---|
| *D06M 13/513* | (2006.01) | |
| *D06M 15/643* | (2006.01) | |
| *B05D 7/00* | (2006.01) | |
| *C03C 25/10* | (2006.01) | |
| *D06M 13/50* | (2006.01) | |
| *D06M 15/55* | (2006.01) | |
| *D06M 15/59* | (2006.01) | |
| *D06M 23/08* | (2006.01) | |
| *D06M 101/40* | (2006.01) | |

(52) U.S. Cl.
CPC .......... *D06M 13/513* (2013.01); *B05D 7/50* (2013.01); *C03C 25/1095* (2013.01); *D06M 13/50* (2013.01); *D06M 15/55* (2013.01); *D06M 15/59* (2013.01); *D06M 15/643* (2013.01); *D06M 23/08* (2013.01); *B05D 2203/30* (2013.01); *B05D 2203/35* (2013.01); *B05D 2504/00* (2013.01); *B05D 2518/10* (2013.01); *B05D 2601/22* (2013.01); *D06M 2101/40* (2013.01); *Y10T 428/249921* (2015.04); *Y10T 442/2951* (2015.04)

(58) Field of Classification Search
CPC ............ D06M 13/513; D06M 15/643; D06M 2101/40; B05D 7/50; B05D 2203/30; B05D 2203/35; B05D 2504/00; B05D 2518/10; B05D 2601/22

USPC ......... 427/180, 203, 204, 220, 407.1, 407.2, 427/407.3
See application file for complete search history.

(56) References Cited

U.S. PATENT DOCUMENTS

| | | | |
|---|---|---|---|
| 6,036,735 A | 3/2000 | Carter et al. | |
| 6,419,981 B1 * | 7/2002 | Novich | C03C 25/00 427/180 |
| 6,720,080 B2 | 4/2004 | Murari et al. | |
| 6,727,309 B1 * | 4/2004 | Paiva | C09D 5/028 428/422.8 |
| 7,989,068 B2 * | 8/2011 | Rao | C03C 17/42 428/375 |
| 2009/0092832 A1 * | 4/2009 | Moireau | C03C 25/101 428/378 |

OTHER PUBLICATIONS

Yu et al., "Superhydrophobic cotton fabric coating based on a complex layer of silica nanoparticles and perfluorooctylated quaternary ammonium silane coupling agent," Applied Surface Science 253 (2007) 3669-3673.*
Christopher O. Oriakhi, Polymer Nano Composite Approach to Advanced Materials, Journal of Chemical Education, vol. 77, No. 9, Sep. 2000.
Hui Chen et al., Modication and Dispersion of Nanosilica-Abstract Journal of Dispersion Science and Technology, vol. 25, No. 6/2004, 837-848, Taylor & Francis.
C.S. Reddy, et al., HLDPE/Organic Functionalized SiO2 Nanocomposited with Improved Thermal Stability and Mechanical Properties, Composite Interfaces, vol. 11, Nos. 8-9, 2005, 687-699.

* cited by examiner

*Primary Examiner* — William Phillip Fletcher, III
(74) *Attorney, Agent, or Firm* — Southeast IP Group, LLC.; Thomas L. Moses; Cameron Applegate

(57) ABSTRACT

A method and product for creating a customizable fabric for specific end-use composites is provided. This method includes creating a three-dimensional matrix on woven fabrics, such as glass or carbon fiber fabrics via the addition of nanoparticles and a coupling agent; and, attaching a functional group compatible to specific resins dependent upon end use. The resulting product is a resin-free fabric with specific functional groups attached, ready to receive a particular polymer resin. Alternatively, the process may continue through to the addition of a polymer resin, resulting in a completed composite product.

20 Claims, No Drawings

NANOPARTICLE FINISH FOR MINERAL AND CARBON FIBERS

CROSS-REFERENCE TO RELATED APPLICATIONS

This application is a continuation-in-part of U.S. application Ser. No. 12/072,961, filed Feb. 29, 2008.

BACKGROUND OF THE INVENTION

The importance of composite materials in the modern world can hardly be overstated. Composites in general can be thought of as a combination of two or more distinctly dissimilar components and include a wide range of products such as sandwich structures, laminates, reinforced polymers, concrete, and fiber reinforced components which achieve high-strength, stiffness, and durability that cannot be achieved alone by the individual components of the composite. Often, one of the components of such composites serves as the matrix in which particles or fibers of the other are uniformly dispersed like aggregate and concrete. In recent years, a new class of materials known as nano-composites has attracted great interest and research. These nano-composites offer properties not obtainable in the aforementioned conventional composites and allow the construction of tailor-made advanced composites.

The nano-composites are multi-phased materials containing two or more dissimilar components mixed on the nanometer scale. Particles of this size approach the range of 100 to 1000 times the size of a typical atom. These nano-composites exhibit new and often improved mechanical, catalytic, electronic, magnetic, and optical properties that are not possessed by their macro-composite or micro-composite counterparts. The reason for these different properties is not yet totally understood. Further description of many known nano-composites and their structures can be found in an article "Polymer Nano Composite Approach To Advance Materials" found in the *Journal of Chemical Education*, at Vol. 77, No. 9, 4 Sep. 2000, this article herein incorporated by reference. Accordingly, it is one of the general objects of the present invention to uniquely apply nano technology to composites that employ mineral and carbon fibers.

To bond inorganic materials such as mineral fibers or carbon fibers with organic materials, silane coupling agents are commonly used. These agents have the ability to form durable bonds between inorganic and organic materials and can bond dissimilar material where at least one of the members is siliceous or has surface chemistry with siliceous properties such as the silicates, aluminates, borates, and the like. The general formula for a silane coupling agent shows two classes of functionality.

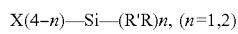

X is a hydrolyzable group; typically alkoxy, acryloxy, halogen oramine. The X functional group is involved in the reaction with the inorganic substrate. The bond between X and the silicon atom in coupling agents is replaced by a bond between the inorganic substrate and the silicon atom. The most common alkoxy groups are methoxy and ethoxy, which give methanol and ethanol as byproducts during coupling reactions. Since chlorosilanes generate hydrogen chloride as a byproduct during coupling reactions, they are generally utilized less than alkoxysilanes.

R is a nonhydrolyzable organic radical that possesses a functionality which enables the coupling agent to bond with organic resins and polymers. Most of the widely used organosilanes have one organic substituent. R' represents an alkyl bridge or spacer connecting the silicon atom and the organofunctional radical.

In most cases the silane is subjected to hydrolysis prior to the surface treatment. Following hydrolysis, a reactive silanol group is formed which can condense with other silanol groups, for example, those on the surface of siliceous fillers, to form siloxane Si—O—Si linkages. The silanol groups can also condense with other oxides—such as metal hydroxyl groups of aluminum, zirconium, tin, titanium, and nickel—to form stable condensation products (Si—O—M bonds). Less stable bonds are formed with oxides of boron, iron, and carbon. Alkali metal oxides and carbonates do not form stable bonds with Si—O—.

The final result of reacting an organosilane with a substrate ranges from altering the wetting or adhesion characteristics of the substrate, utilizing the substrate to catalyze chemical transformations at the heterogeneous interface, ordering the interfacial region, and modifying its partition characteristics. Significantly, it includes the ability to effect a covalent bond between organic and inorganic materials. The interfaces involving such materials are modified in order to incorporate the flow properties of the material forming the composite structure. Thus, the use of the silane or organosilane coupling agents on mineral surfaces such as fiberglass will bond a polymeric surface such an epoxy or fluorocarbon to the glass surface.

One of the nano-materials of particular interest is nano-silica. An abstract reported in the *Journal of Dispersion Science and Technology*, Vol. 25, No. 6/20004 at pp. 837 to 848, herein incorporated by reference, reported on the grafting of nano-silica particles with a specific modification agent. In another article entitled "HLDPE/Organic Functionalized SiO$_2$Nano-composites With Improved Thermal Stability And Mechanical Properties" (also incorporated herein by reference) it is reported that addition of pretreating nanosilica with organic multifunctional modifiers lead to an increase of thermal stability, elastic modulus, and toughness.

Accordingly, it is a specific object of the present invention to incorporate the beneficial properties of nano mineral particles in finishes for yarns and fabrics of mineral and carbon fibers.

The invention will be better understood by reference to the Summary of the Invention and Detailed Description which follow.

BRIEF SUMMARY OF THE INVENTION

This invention relates generally to a fabric finish for reinforcing composites and, more specifically, to a fabric finish and matrix material that is compatible with a resin specific for end-use composites.

More specifically, this invention provides a method for creating a customizable fabric for specific end-use composites. This method includes creating a three-dimensional matrix on woven glass or carbon fiber fabrics via the addition of nanoparticles and a coupling agent; and, attaching a functional group compatible to specific resins dependent upon end use.

In thermosetting molding operations, good "wet-through" (penetration of a polymeric matrix material through the mat or fabric) and "wet-out" (penetration of a polymeric matrix material through the individual bundles or strands of fibers in the mat or fabric) properties are desirable. In contrast, good dispersion properties (i.e., good distribution properties of fibers within a thermoplastic material) are of predominant concern in typical thermoplastic molding operations.

In the case of composites or laminates formed from fiber strands woven into fabrics, in addition to providing good wet-through and good wet-out properties of the strands, it is desirable that the coating on the surfaces of the fibers strands protect the fibers from abrasion during processing, provide for good weavability, particularly on air jet looms and be compatible with the polymeric matrix material into which the fiber strands are incorporated. However, many sizing components are not compatible with the polymeric matrix materials and can adversely affect adhesion between the glass fibers and the polymeric matrix material. As a result, these incompatible materials must be removed from the fabric prior to impregnation with the polymeric matrix material.

Furthermore, to improve adhesion between the de-greased or de-oiled fabric and the polymeric resin, a finishing size, typically a silane coupling agent and water, is applied to the fabric to re-coat the glass fibers in yet another processing step (commonly called "finishing").

It has been surprisingly discovered that a unique and useful finish for mineral fibers and carbon fibers and fabrics can be achieved with the incorporation of nano materials in the finishing composition. In one aspect, the present invention is a composition for use in finishing mineral and carbon fibers; the composition comprising nano mineral particles grafted with the molecules of a coupling agent whereby, upon application of the composition to a mineral or carbon fiber surface, the nano minerals graft onto the fiber surface and form a three-dimensional matrix of the coupling agent. This three-dimensional matrix increases the surface area of the fabric. The coupling agent is preferably a silane copolymer coupling agent and may include a silane copolymer cross-linking agent. The mineral fiber may preferably be selected from the group consisting of fiberglass, S and $S_2$ fiberglass and quartz fibers, although other inorganic and organic fibers may be used.

In another aspect, the present invention is a process for finishing mineral and carbon fibers and fabrics comprising the steps of scouring the fabric to remove processing aids and any surface contaminants, applying a composition of silane copolymer coupling agent with nano mineral particles grafted to the silane of the scoured fabric surface; and applying a selected polymer to the grafted surface thereby finishing the fabric for its intended use.

The finished fabric of the present invention preferably has a unique coating that can facilitate thermal conduction along the coated surface. When used as a continuous reinforcement for an electronic circuit board, such coated fabric of the present invention can provide a mechanism to promote heat dissipation from a heat source (such as a chip or circuit) along the reinforcement to conduct heat away from the electronic components and thereby inhibit thermal degradation and/or deterioration of the circuit components, glass fibers and polymeric matrix material. The fabric of the present invention preferably provides a higher thermal conductivity phase than the matrix material, i.e., a preferential path for heat dissipation and distribution, thereby reducing differential thermal expansion and warpage of the electronic circuit board and improving solder joint reliability. It is also for improving dielectric constant and dissipation of the electronic composites.

Composites, and in particular laminates, of the present invention, preferably possess at least one of the following properties: low coefficient of thermal expansion; good flexural strength; good interlaminar bond strength; and good hydrolytic stability, i.e., the resistance to migration of water along the fiber/matrix interface. Additionally, electronic supports and printed circuit boards from composites made in accordance with the present invention preferably have at least one of the following properties: good drillability; and resistance to metal migration.

The process of the present invention is preferably performed on a woven fabric, as opposed to fibers, resulting in advantages over what is typically used in the art. When the present process is performed on a woven fabric, a three-dimensional matrix is formed across the entire surface of the fabric, resulting in an increase in total surface area, resulting in superior resin bonding and ultimately a better quality composite.

DETAILED DESCRIPTION OF THE INVENTION

Fiberizable glass materials useful in the present invention include but are not limited to those prepared from fiberizable glass compositions such as "E-glass", "A-glass", "C-glass", "D-glass", "R-glass", "S-glass", and E-glass derivatives. As used herein, "E-glass derivatives" means glass compositions that include minor amounts of fluorine and/or boron and most preferably are fluorine-free and/or boron-free. Such compositions are well known to those skilled in the art.

Non-limiting examples of suitable non-glass fiberizable inorganic materials include ceramic materials such as silicon carbide, carbon, graphite, mullite, aluminum oxide and piezoelectric ceramic materials. Non-limiting examples of suitable fiberizable organic materials include cotton, cellulose, natural rubber, flax, ramie, hemp, sisal and wool. Non-limiting examples of suitable fiberizable organic polymeric materials include those formed from polyamides (such as nylon and aramids), thermoplastic polyesters (such as polyethylene terephthalate and polybutylene terephthalate), acrylics (such as polyacrylonitriles), polyolefins, polyurethanes and vinyl polymers (such as polyvinyl alcohol). Non-glass fiberizable materials useful in the present invention and methods for preparing and processing such fibers are discussed at length in the *Encyclopedia of Polymer Science and Technology*, Vol. 6 (1967) at pages 505-712, which is specifically incorporated by reference herein.

It is understood that blends or copolymers of any of the above materials and combinations of fibers formed from any of the above materials can be used in the present invention, if desired. The present invention will now be discussed generally in the context of glass fabrics and carbon fiber fabrics, although one skilled in the art would understand that fabrics formed from any fiberizable material known in the art as discussed above may be used.

The process of the present invention includes treating a fabric substrate with a silane coupling agent, followed by the addition of nanoparticles, and lastly the attachment of specific functional groups compatible to the resin chosen for the final composite. These functional groups are attached via an organofunctional silane coupling agent, and are chosen based upon the specific end use of the composite.

As described previously, the silane coupling agent has two functional groups, an organic substituent capable of bonding with an organic substrate, and an inorganic hydrolysable substituent capable of bonding with an inorganic substrate. The silanes of the reactive type serve as coupling agents between the glass fibers and the thermoplastic matrix. The reactive silanes commonly contain a silicone head(s) and a tail(s) containing a functional group or groups that can react with the thermoplastic matrix. These include primary, secondary, or tertiary amines, vinyl, styryl, alkynyl, methacryloyl, acryloxy, epoxy, thio, sulphide, ureido, isocyanate, oxime, ester, aldehyde, and hydroxy moieties in either unprotected or protected form. The silicone head can be substituted with groups such as ethoxy, methoxy, methyldimethoxy, methydiethoxy, isopropoxy, acetoxy, etc. When an inorganic substrate such as quartz or glass fabric is treated with an aqueous solution containing a silane coupling agent, hydrolysis of the labile groups occurs, resulting in silane oligomers bonding with the fabric substrate. A final drying process results in a covalent linkage between the fabric and the silane, simultaneously leaving the organic radical of the silane free for bonding to a compatible organic substrate.

In a separate step, inorganic nanoparticles may be treated with a silane coupling agent. The nanoparticles of an inorganic material are relatively inert under the conditions used in the current composition, and commonly possess an average particle size of approximately 3 to 40 nm. In preferred embodiments, the nanoparticles of an inorganic material are provided as substantially amorphous spheres; however, other particle shapes are suitable for use and may have different ratios of surface areas to their sizes. Preferably, the nanoparticles of an inorganic material are silica of the specified particle size. Other representative nanoparticles of an inorganic material suitable for use in the present invention include, but are not limited to, clays, including montmorillonite-type clays, glass, nanosized particles of metals or non-metals such as titanium dioxide, zinc oxide, barium oxide, silver, cerium gadolinium oxide, palladium, iron ferrite nanoparticles, aluminium polyphosphate, nanodiamonds, or other functionalized or unfunctionalized inorganic nanoparticles having modified or unmodified surfaces. Additionally, mixtures of the nanoparticles may be utilized. In the present invention, the inorganic functional group of the silane bonds with the nanoparticles, leaving the organic functional group free for bonding. When the silane coated fabric is treated with these silane-coupled nanoparticles, the free organic functional groups on both the fabric and the nanoparticles cross-link, resulting in the nanoparticles being bound to the surface of the fabric via the silane coupling agents. This coupling of nanominerals to the woven fabric substrate creates a three-dimensional matrix, thus increasing the surface area of the fabric. An increased surface area allows for increased bonding of the selected polymer resin, resulting in a better quality end-use composite.

In a third step, a functional group may be attached to the nanoparticle-coated fabric; this functional group (such as epoxy, amino, vinyl, for example) being compatible to the resin selected for the end-use composite. This functional group is preferably attached through the use of a silane coupling agent, whereby the hydrolyzable group bonds with the nanoparticle leaving the organic functional group available for bonding to a polymer resin. The organic functional group of this third silane is customizable and specifically chosen dependent upon the end-use composite.

When using an organic fabric substrate such as carbon fiber fabric, the organic functional group of the silane coupling agent will bond to the carbon fiber fabric, leaving the inorganic hydrolyzable group free for bonding directly to the nanoparticles (or vice versa, the inorganic group will bond to the nanoparticles, leaving the organic group free for bonding to the organic fabric). In this case, the fabric and nanominerals do not need to be treated separately with a silane coupling agent prior to the nanominerals being attached to the fabric. Rather, the fabric may be dipped in an aqueous solution containing the nanoparticles and a silane coupling agent.

In a preferred process, a fabric of woven fibers of glass or carbon is scoured to remove any processing aids or debris that may have attached to the fiber during the spinning and weaving process. This cleaning step best prepares the fabric to receive the silane coupling agent during the treatment process. In particular, carbon fiber should be cleaned, pretreated and activated through means well-known in the art, such as heating, etching, or corona treatment. After the fabric has been cleaned and scoured, the fabric surface is ready to react with the silane coupling agent.

In one preferred example, aminosilane may be added to glass fabric through a dip and squeeze process. First, the fabric is dipped in an aqueous solution of aminosilane, water, and a surfactant to aid in dispersion. The solution preferably contains 0.1-2% of aminosilane and 0.01-0.5% surfactant by weight. Preferred surfactants or lubricants are the mono- or diesters of a fatty acid or oil reacted with polyethylene glycol, having hydrophilic and lipophilic areas. During this process, the hydrolyzable inorganic group of the aminosilane bonds to the glass fabric. After being dipped, sprayed, or rolled in a bath containing the substrate solution, the fabric is removed and squeezed to remove any excess solution. This process may be repeated 2-3 times or more to ensure that the fabric is completely saturated and coated with the silane substrate. The dip and squeeze process may be performed stationary, such as in a jig, or may be a continuous process, such as in a range; other suitable processes may be used as well. After the fabric has undergone a dip and squeeze process, the fabric is dried preferably at 275-400 degrees F. depending on the type of fabric. This drying may be performed in a convection oven for anywhere from 30 seconds to 5 minutes, or until all moisture is removed. Additional drying methods such as infrared, microwave power, laser, or other methods can also be utilized to dry the fabric. In such cases, the temperature may be below or above the above mentioned ranges.

In a separate step, small spherical nanoparticles such as silica, quartz, ceramic, nano-metallic particles, and the like are treated with organo-functional silane. In a preferred embodiment, epoxy silane may be used. The nanospheres and organo-functional silane are dispersed in an aqueous solution with surfactants to facilitate and maintain dispersion. The solution preferably contains 5-25% nanoparticles, 0.5-5% organo-functional silane, and 0.01-0.5% surfactant in water. When dispersed together in solution, the inorganic group present on the epoxy silane bonds to the nanoparticles.

Next, the fabric may undergo a second treatment whereby the fabric is dipped in the aforementioned solution containing the silane-treated nanoparticles. The epoxy group of the epoxy silane on the nanoparticles bonds to the amino group of the aminosilane on the glass fabric. This treatment may be the same dip and squeeze treatment described above, alternatively the fabric may be sprayed or rolled through a bath containing the solution. This process may be repeated 2-3 times to ensure the fabric is completely saturated with solution, and to ensure that all the available silane groups on the surface of the fabric have undergone bonding with the available nanoparticles. Following this second treatment, the fabric is dried as previously described until no moisture remains.

At this point, the appropriate functional group(s) may be added based on the desired end-use composite. For example, if the desired polymer composite is an epoxy thermosetting resin, then an epoxy group would be the preferred functional group to attach to the fabric. In this case, an epoxy silane may be used in this fourth step. The fabric may undergo the same dip, squeeze, and drying process described previously.

In one embodiment of the present invention, the resulting product is a resin-free fabric with specific functional groups attached, ready to receive a particular polymer resin. This allows for the manufacturing of a fabric that may be sold to a customer, whereby the customer may then add the appropriate resin desired for the end-use product. In this way, a customizable fabric may be manufactured. In an alternative embodiment, the process may continue through to the addition of a polymer resin, resulting in a completed composite product.

Although the present invention is described above in specific terms, values, and ranges, it is to be known that suitable substitutes may be made without departing from the spirit and scope of the invention. One skilled in the art is capable of knowing, for example, which functional groups are compatible for specific end use resins, which nanoparticles and silane coupling agents would be appropriate in combination, and what types of substitutions may be appropriate or suitable.

We claim:

1. A process for finishing mineral fabrics comprising the steps of:
    a) cleaning said mineral fabric to remove any processing aids and impurities;
    b) attaching a silane coupling agent to said mineral fabric;
    c) attaching a silane coupling agent to nano mineral particles;
    d) grafting said nano mineral particles to said mineral fabric, forming a three-dimensional matrix and providing increased surface area;
    e) determining the end-use composite;
    f) selecting a functional group based on polymer resin of said end-use composite;
    g) attaching said functional group to said mineral fabric whereby said product is a resin-free fabric ready to receive a polymer resin coating.

2. The process of claim 1, further including the step of applying a polymer coating to said mineral fabric.

3. The process of claim 1, wherein said silane coupling agent attached to said mineral fabric is an aminosilane and said silane coupling agent attached to said nano mineral particle is an epoxy silane.

4. A process for finishing carbon fiber fabrics comprising the steps of:
    a) pretreating the surface of said carbon fiber fabric to activate the fabric for receiving a silane;
    b) attaching a silane coupling agent to said carbon fiber fabric;
    c) grafting nano mineral particles to said silane coupling agent attached to said carbon fiber fabric, forming a three-dimensional matrix and providing increased surface area;
    d) determining the end-use composite;
    f) selecting a functional group based on polymer resin of end-use composite;
    g) attaching said functional group to said carbon fiber fabric whereby said product is a resin-free fabric ready to receive a polymer resin coating.

5. The process of claim 4, further including the step of applying a polymer coating to said carbon fiber fabric.

6. A process for increasing the strength and structural integrity of a structural composite composed of at least on substrate of one of a woven fabric and a nonwoven fabric comprising the steps of:
    a) activating said fibers by cleaning the fabric to remove any processing aids and impurities on the surface thereof;
    b) attaching a silane coupling agent to said fibers;
    c) grafting nano mineral particles to silane copolymer molecules and said fibers providing increased surface areas for the subsequent bonding with a polymer coating fabric;
    d) applying a polymer coating to said treated fabric over said coupling agent and nano particles providing bonding with said increased surface areas so that the composite has increased strength and structural integrity.

7. The process of claim 6 wherein grafting said nano particles by applying a solution containing said coupling agent and said nano particles to said fibers.

8. The process of claim 6 including grafting said nano particles by first applying said coupling agent to said fibers and second by subsequently applying said nano particles to said coupling agent and fibers.

9. The process of claim 6 including the step of applying a second coating of a coupling agent to said first mentioned coupling agent.

10. The process of claim 6 wherein the fabric includes carbon fibers.

11. The process of claim 6 wherein the fabric is includes fiberglass and the polymer is an epoxy.

12. A process for finishing a structural composite material for use in structural and electrical components comprising the steps of:
    a) providing a plurality of fibers formed into a textile fabric;
    b) adhering a coupling agent to said fabric;
    c) grafting a plurality of nano mineral particles to said fabric by said coupling agent forming a three-dimensional matrix with increased surface areas;
    d) determining the end-use composite;
    e) selecting a functional group to attach to said nano mineral particles and said fabric based on said end-use composite;
    f) attaching said functional groups to said nano mineral particles and said fabric resulting in a resin-free fabric ready for subsequent bonding to a polymer resin.

13. The process of claim 12, further including the step of providing a cross-linking agent, wherein molecules of the cross-linking agent have a first group bonded to the nano particles and a second group available for cross-linking with a polymer resin coating.

14. The process of claim 12, further comprising the step of bonding a polymer resin coating to the second groups on the molecules of the cross-linking agent.

15. The process of claim 12, wherein the fibers are selected from the group consisting of fiberglass and quartz fibers.

16. The process of claim 12, wherein the fibers are carbon fibers.

17. The process of claim 12, wherein the coupling agent is a silane copolymer.

18. The process of claim 12, wherein the nano particles are nano-silica particles.

19. The process of claim 12 further including the step of coating said fabric with a polymer resin.

20. The process of claim 19, wherein the polymer resin is selected from the group consisting of epoxides, polyimides and polyamides.

* * * * *